(12) United States Patent
Laker et al.

(10) Patent No.: US 10,821,364 B2
(45) Date of Patent: Nov. 3, 2020

(54) ENHANCED ITEM DISCOVERY AND DELIVERY FOR ELECTRONIC VIDEO GAME SYSTEMS

(71) Applicant: Electronic Arts Inc., Redwood City, CA (US)

(72) Inventors: Shaun Mackenzie Laker, New Westminster (CA); Dylan Charles Loney, Burnaby (CA)

(73) Assignee: Electronic Arts Inc., Redwood City, CA (US)

( * ) Notice: Subject to any disclaimer, the term of this patent is extended or adjusted under 35 U.S.C. 154(b) by 0 days.

(21) Appl. No.: 16/137,445

(22) Filed: Sep. 20, 2018

(65) Prior Publication Data
US 2020/0094146 A1 Mar. 26, 2020

(51) Int. Cl.
| | |
|---|---|
| *A63F 13/69* | (2014.01) |
| *A63F 13/35* | (2014.01) |
| *A63F 13/537* | (2014.01) |
| *A63F 13/58* | (2014.01) |
| *G06F 3/0482* | (2013.01) |

(52) U.S. Cl.
CPC .............. *A63F 13/69* (2014.09); *A63F 13/35* (2014.09); *A63F 13/537* (2014.09); *A63F 13/58* (2014.09); *G06F 3/0482* (2013.01)

(58) Field of Classification Search
CPC ........ A63F 13/69; A63F 13/35; A63F 13/537; A63F 13/58; G06F 3/0482
See application file for complete search history.

(56) References Cited

U.S. PATENT DOCUMENTS

| | | | | |
|---|---|---|---|---|
| 2004/0266505 | A1* | 12/2004 | Keam ..................... | A63F 13/12 463/1 |
| 2009/0318221 | A1* | 12/2009 | Dhunjishaw ......... | G06Q 20/023 463/29 |
| 2014/0004955 | A1* | 1/2014 | Nahari .................... | A63F 13/12 463/42 |
| 2014/0162763 | A1* | 6/2014 | Kim ....................... | A63F 13/12 463/25 |

(Continued)

*Primary Examiner* — Werner G Garner
(74) *Attorney, Agent, or Firm* — Knobbe, Martens, Olson & Bear, LLP

(57) ABSTRACT

Systems and methods are provided for enhanced item discovery and delivery for electronic video game systems. An example method includes establishing connections with a plurality of user devices, the user devices executing respective game engines associated with an electronic game, with each user device being controlled by a respective player of a same game world and presenting a respective view of the game world associated with a respective character within the game world. Information indicating that a wishlist associated with a first player is to be updated is received, with updating including associating a particular item with the wishlist, the particular item being equipped by a second character of a second player within the game world. Information is obtained which indicates that the particular player has provided user input to cause ordering of the particular item. In response to determining satisfaction of one or more constraints, access to the particular item by the first player is enabled, with the first character of the first player being configured to equip the particular item, and with the particular item being rendered on the first character within the game world.

20 Claims, 9 Drawing Sheets

(56) References Cited

U.S. PATENT DOCUMENTS

| | | | |
|---|---|---|---|
| 2015/0174490 A1* | 6/2015 | Fukuda | A63F 13/5378 463/31 |
| 2015/0245172 A1* | 8/2015 | Fernebok | H04W 4/029 455/456.3 |
| 2019/0213566 A1* | 7/2019 | Ju | A63F 13/77 |
| 2019/0217192 A1* | 7/2019 | Fajt | A63F 13/40 |

* cited by examiner

Wishlist Custom Order

From here, you can Custom Order an Item from Your Wishlist! Items take Some Time to Appear, so be Patient!

To Add Items to Your Wishlist, inspect another Player!

ENHANCED ITEM DISCOVERY AND DELIVERY FOR ELECTRONIC VIDEO GAME SYSTEMS

TECHNICAL FIELD

The present disclosure relates to systems and techniques for enhancing electronic games. More specifically, this disclosure relates to improvements in usability of electronic games.

BACKGROUND

Electronic games are increasingly utilizing social aspects to engender continued player engagement. Particular electronic games, such as massively multiplayer online role playing games (MMORPG), can enable players to manipulate characters within a persistent game world. For example, one or more central servers systems may maintain a consistent game state associated with the MMORPG. The players may therefore adjust the game state based on their movements, actions, and so on, and the players can all view the same game world. For example, the players can move about the game world and interact with each other. Example interactions may include engaging in specific missions, searching for items, and so on. With respect to social aspects, the MMORPG can enable the players to communicate with each other.

An example of communication can include routing verbal speech provided by a player to other players. For example, the other players' characters may be within a certain proximity in the game world. The verbal speech may be provided a player to his/her headset or other microphone source. As another example of communication, text may be entered by players and routed to the remaining players. Additionally, each player may be associated with a user name. Therefore, the players within the game world can be identified according to user name and the players may communicate with each other. In this way, the players may socially engage each other, for example outside of exclusively engaging in game missions.

SUMMARY OF CERTAIN EMBODIMENTS

Particular embodiments of the subject matter described in this specification can be implemented so as to realize one or more of the following advantages. The techniques described herein can enable improvements to electronic games. The example improvements may include improvements to usability of electronic games. For example, and as will be described, the techniques can reduce a number of user actions required to perform particular functionality. The user actions, in this example, may relate to finding particular items within a game world associated with an electronic game. It should be appreciated that electronic games, for example online electronic games, may disperse items throughout a game world for players to locate. As an example, particular in-game objects may be placed within virtual item containers in the game world (e.g., by one or more servers associated with the online electronic game). These items may be new items which the players attempt to find, or they may be random items from a set of available items. Thus, the items' availability may be limited. Additionally, if a player happens upon a virtual item container within the game world, there is no guarantee as to which item the virtual item container contains.

While dispersing items within an online game world can address the technological problem of enabling player access to new items, this scheme can introduce disparity with respect to the items available to the players. As an example, a first player may locate a virtual item container and obtain a particular item from the virtual item container. In this example, a second player may be unable to locate the particular item. For example, the particular item may be scarce such that only a threshold number of virtual item containers contain the particular item. As another example, a probability associated with a virtual item container containing the particular item may be low. Thus, the second player may be unable to locate the particular item. Given the online nature of the electronic game, the second player may be able to view (e.g., via a user device) the first player's virtual character. With respect to a virtual item, the first player's character may be wearing the particular item. The second player may desire to acquire this particular item.

Via the techniques described herein, the second player may include this particular item in a 'wishlist'. For example, the 'wishlist' may be maintained by one or more central server systems (e.g., within user profile information), or maintained by a user device of the second player. The wishlist can store indications of items which the second player has seen within the game world and which the second player desires to acquire. As will be described, the second player may then trigger delivery, or crafting, of a particular item within the wishlist.

Advantageously, the techniques described herein may thus reduce the above-described player's need to search within the game world for a particular item. Thus, the player may limit an extent to which user input is required to perform an action (e.g., locating an item).

Furthermore, and as will be described, the techniques described herein can increase usability of, and player engagement within, electronic video games. With respect to the example of the second player described above, the second player may be required to inspect the first player's character to identify the items the first player is carrying. For example, the second player may control his/her character to bring the character within a threshold proximity to the first player's character. The second player may therefore perform an inspection of the first payer's character. Via this inspection, the second player may obtain an indication of the items which the first player's character has.

Advantageously, this inspection technique may cause an improved social aspect to the electronic game. For example, the first player and second player may be incentivized to communicate about their respective items. Furthermore, the schemes to cause the spreading of items around an online game world may be improved. As an example, a player may be required to perform certain in-game actions, such as completing a mission, to enable access to an item included in his/her wishlist. This scheme therefore can therefore enhance the user experience of online games, and additionally cause players to increase their sociality within an online game.

The systems, methods, and devices of this disclosure each have several innovative aspects, no single one of which is solely responsible for the all of the desirable attributes disclosed herein.

One embodiment discloses a system comprising one or more computers and computer storage media storing instructions that, when executed by the system, cause the system to perform operations comprising: establishing connections with a plurality of user devices, the user devices executing respective game engines associated with an electronic game, each user device being controlled by a respective player of a same game world and presenting a respective view of the game world associated with a respective character within the game world; receiving information indicating that a wishlist associated with a first player is to be updated, wherein updating comprises associating a particular item with the wishlist, the particular item being equipped by a second character of a second player positioned, at least, within a threshold proximity of a first character of the first player within the game world; obtaining information indicating that the particular player has provided user input to cause ordering of the particular item; and in response to determining satisfaction of one or more constraints, enabling access to the particular item by the first player, wherein the first character of the first player is configured to equip the particular item, and wherein the particular item is rendered on the first character within the game world.

Although certain embodiments and examples are disclosed herein, inventive subject matter extends beyond the examples in the specifically disclosed embodiments to other alternative embodiments and/or uses, and to modifications and equivalents thereof.

The details, including optional details, of one or more embodiments of the subject matter of this specification are set forth in the accompanying drawings and the description below. Other optional features, aspects, and advantages of the subject matter will become apparent from the description, the drawings, and the claims.

BRIEF DESCRIPTION OF THE DRAWINGS

Throughout the drawings, reference numbers are re-used to indicate correspondence between referenced elements. The drawings are provided to illustrate embodiments of the subject matter described herein and not to limit the scope thereof.

Like reference numbers and designations in the various drawings indicate like elements.

DETAILED DESCRIPTION

Overview

Figure 1A:
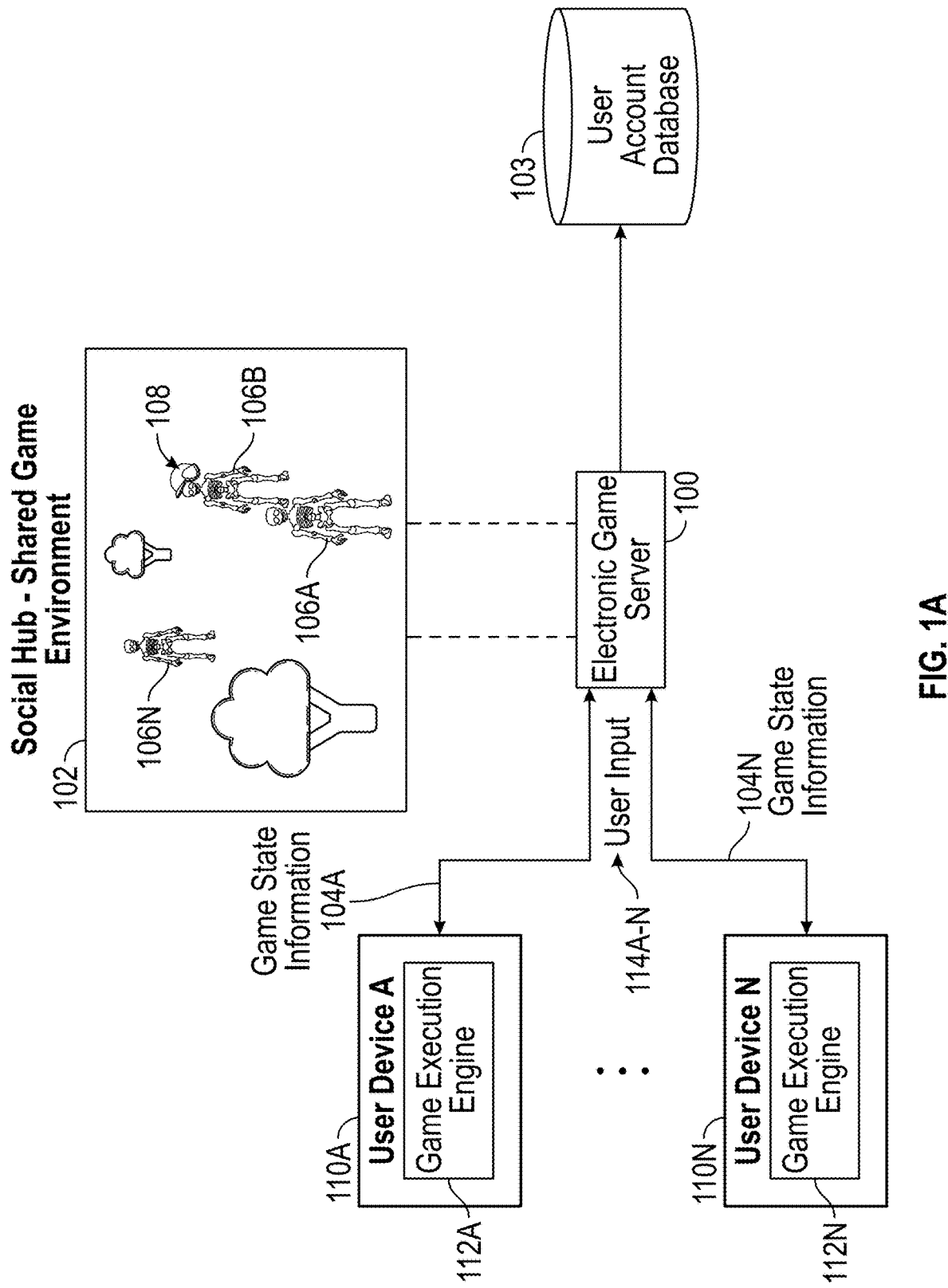
FIG. 1A is a block diagram illustrating an example electronic game server enabling access by user devices to a social hub, according to some embodiments of the present disclosure.

This specification describes techniques to enhance player access to items within an example electronic game. The electronic game described herein is an example of an online game, such as a game in which multitudes of players utilize respective user devices to control characters within a same game world of the online game. As will be described, an example system described herein (e.g., the electronic game server 100) can be in communication with the user devices and enable a consistent game state associated with the game world. Therefore, the players may control respective characters within the same game world, for example interacting with aspects of the game world and/or other characters. The electronic game may enable player utilization of different items. For example, these items may be utilized by the players for their characters. As described herein, items may include any game element which can be associated with a player's character. Example items may be cosmetic items, such as accessories, clothing, tattoos, skins, facial hair, and so on. Example items may further be non-cosmetic items, such as parts to construct game objects, objects (e.g., objects which can interact with players or the game world, such as keys, weapons, and so on), potions, gestures (e.g., to be performed by characters), abilities, and so on.

It should be appreciated that electronic games may disperse items throughout one or more of its game worlds, with the items being associated with respective rarities (e.g., respective probabilities that players may locate the items). An example scheme to disperse items includes placing containers (herein referred to as 'virtual item containers') within the game worlds. The virtual item containers may contain (e.g., within the game world) different items. For example, the system may select (e.g., randomly) items to be included in each virtual item container (e.g., from a set of available of items). The virtual item containers may additionally be randomly generated by the system, and/or randomly placed within the game worlds. To place the virtual item container within a game world, the system may update information associated with the game world. For example, the system may update a game state to reflect the inclusion of virtual item containers within game worlds accessible to players of the online game.

A player may therefore control a character within the online game, and during gameplay may identify a virtual item container within the character's field of view. For example, a user device being utilized by the player (e.g., a laptop, tablet, mobile device, wearable device, and so on) may present user interface information associated with the online game. In this example, the user interface information may include a representation of a game world in which the player's character is moving about. For example, the representation may be a view associated with the player's character. Example views may include a first-person view of the game world, a third-person view of the game world, a top-down view of the game world, and so on. Upon identifying the virtual item container, the player may cause the character (e.g., via user input to the user device) to access the virtual item container. Since the virtual item container is configured to contain one or more items, the player's character may thus obtain the items. For example, the system may update game state information associated with the player. As another example, the player's user device may update locally stored information (e.g., profile information, game state information) to reflect the obtained items. Therefore, the player may utilize the items, such as via causing his/her character to equip the item. With respect to the item being a hat, the character may wear the hat during the online game.

During gameplay, an example player's character may therefore have an item equipped, or otherwise utilized, which was obtained from a virtual item container. With respect to the example of a hat described above, the visual representation of the character may thus be wearing a hat. As other players control respective characters in the game world, these players may view the hat equipped on the example player's character. For example, the players' characters may be in a game world, or a portion thereof, in which the characters can interact socially (herein referred to as a 'social hub'). While in the social hub, the players may communicate with each other. Optionally, players may be unable to harm each other's characters. As will be described, the players may advantageously utilize the social hub to view, or receive information indicating, the items associated with the characters within the social hub. As described above, certain items may be more rare than other items. Thus, the hat may represent an item which is uncommon (e.g., contained in virtual item containers at less than a threshold percentage). In contrast to other schemes, in which the players would need to search for virtual item containers which may contain the hat, the players may instead include the item in respective wishlists. As will be described below, a wishlist identifies items which a player desires to utilize or own.

To include an item on a wishlist, for example the hat described above, a first player may control a first character to inspect a second character controlled by a second player. For example, the first player may move the first character proximate to the second character (e.g., the first player may be required to be within a threshold distance of the second character). As will be described below, the first player may cause presentation of the items equipped, or otherwise utilized, by the second character. As an example, the first player may provide user input to his/her user device requesting an inspection of the second character. This user input may then be provided to the system described herein, which can access the items associated with the second character. The system may then cause a user interface presented on the first player's user device to reflect the accessed items. An example of a user interface is described below, and illustrated in FIG. 1B with respect to user interface 130.

Using the above-described user interface, the first player may review the items associated with the second character. Optionally, the first player may select a particular item presented in the user interface and indicate the selected item is to be included in the first player's wishlist. Optionally, the system may then determine whether one or more constraints are satisfied. If the constraints are satisfied, the system can enable the first player to equip, or otherwise utilize, the selected item. An example constraint may include a user experience level of the first player's character exceeding a threshold. Another example constraint may include one or more game missions, goals, and so on, which need to be completed. Another example constraint may include requiring a threshold quantity of in-game currency (e.g., points, gold, coin, cryptocurrency, and so on) be utilized by the first player.

Upon satisfaction of the constraints, the system may provide access to the selected item. Optionally, the system may cause the first player to wait a threshold amount of time (e.g., 24 hours, 36 hours, 48 hours, and so on) prior to being able to utilize the selected item. Thus, in this example access to the selected item may be temporarily constrained. As described herein, this threshold amount of time may be referred to as a 'construction time' or 'shipping time' associated with the selected item. Optionally, the threshold amount of time may vary according to the selected item. As an example, the threshold amount of time may vary according to rarity of the selected item. In addition to constraining access according to time, the system may ensure that a player has performed certain mission goals or objectives. As an example, the player's character may have to obtain certain in-game items associated with constructing the selected item. As another example, the player's character may have to complete certain portions of the electronic game (e.g., completing one or more levels, achieving an objective, beating a boss, interacting with certain non-playable characters, and so on).

Optionally, and as will be described below with respect to FIG. 5, a player may add items to a wishlist based on viewing a video of a third-party player's gameplay. The video may be, for example, a live video of the third-party player's character. For example, the system may generate a view as seen by the third-party player on his/her user device. In this example, the system may enable access to this generated view. As another example, the third-party player's user device may upload the view presented on the user device to a video streaming web site. The video may also be, for example, previously recorded and being viewed by the player via a streaming web site, within the electronic game (e.g., in a theater room in which the player's character can sit), and so on. Based on viewing the video, the player may request the items associated with the third-party player's character. For example, with respect to the example of a streaming web page, metadata associated with the stream may indicate the items. As another example, with respect to the player viewing the video within the electronic game, the player may provide user input associated with requesting the items. Similar to the above-description regarding wishlists, the player may then include one or more of the items in his/her wishlist.

FIG. 1A is a block diagram illustrating an example electronic game server 100 enabling access by user devices 110A-110N to a social hub 102, according to some embodiments of the present disclosure. As described above, the user devices 110A-N may be utilized by players to play a particular electronic game. For example, the electronic game may be an online game enabling the players to control characters within a game world (e.g., the persistent virtual world described below). The electronic game server 100 may communicate with the user devices 110A-N to ensure that the characters can properly be controlled within the game world. For example, the electronic game server 100 may maintain game state information indicating locations of characters, locations of objects or enemies, and so on.

For example, the electronic game server 100 can include one or more application host systems (e.g., systems of one or more computers, or one or more virtual machines executing on systems of one or more computers) and one or more databases (e.g., database 103) storing user account, or user profile, information associated with the players. The electronic game server 100 may include one or more computing systems configured to execute a portion of the electronic game and/or application host systems. For example, the electronic game server 100 may execute instances of server-side software associated with the electronic game. In some embodiments, the one or more application host systems can include one or more computing devices, such as servers and databases that may host and/or execute a portion of one or more instances of the electronic game. In certain embodiments, instead of, or in addition to, executing a portion of the electronic game, the application host systems may execute another application, which may complement and/or interact with the electronic game application.

The electronic game server 100 may enable multiple user devices 110A-11N to access a portion of the electronic game executed or hosted by the electronic game server 100. In some embodiments, the portion of the electronic game executed by the electronic game server 100 may create a persistent virtual world. This persistent virtual world may enable one or more users to interact with the virtual world and with each other in a synchronous and/or asynchronous manner. In some cases, multiple instances of the persistent virtual world may be created or hosted by the electronic game server 100. A set of users may be assigned to or may access one instance of the persistent virtual world while another set of users may be assigned to or may access another instance of the persistent virtual world. In some embodiments, the electronic game server 100 may execute a hosting system for executing various aspects of a game environment. For example, in one embodiment, the electronic game may be a competitive game, such as a first-person shooter or sports game, and the electronic game server 100 can provide a dedicated hosting service for hosting multiplayer game instances or facilitate the creation of game instances hosted by user devices 110A-110N. In some embodiments, the electronic game server 100 can provide a lobby or other environment (e.g., the social hub 102) for users to virtually interact with one another. Such environments may include environments for conducting transactions between players, such as an auction house or type of environment for facilitating transactions.

As illustrated in FIG. 1A, each user device 110A-N may comprise a game execution engine 112A-N associated with the electronic game. The game execution engine 112A-N may cause presentation of user interface information associated with the electronic game. For example, the user interface information may include a view as seen by a character controlled by a player of a user device. As another example, the user interface information may include a heads-up display (a 'HUD'), menus, and so on. Additionally, the game execution engine 112A-N may provide user-side information to the electronic game server 100. For example, the user-side information may comprise user input 114A-N provided to the user devices 110A-N (e.g., by players). As another example, the user-side information may comprise update information generated by the user devices 110A-N. The update information may reflect updates to the game world caused by actions of a user device. For example, a user device may provide updates regarding locations of characters, actions performed by a player on the user device, and so on. In this way, the electronic game server 100 may ensure that the views presented on the user devices 110A-N are of the same consistent game world.

The game execution engine 112A-N may represent software, or other executable code, obtained as a download to the user devices 110A-110N. For example, the game execution engine 112A-N may be obtained from an online repository of electronic games. Once obtained, the game execution engine 112A-N may be installed on the respective user devices 110A-N. As another example, the game execution engine 112A-N may represent an application obtained from an online application store (e.g., an 'app'). In the above-described examples, the game execution engine 112A-N may render a user interface associated with the electronic game for presentation on the user devices 110-N. For example, the game execution engine 112A-N may access locally stored user interface information, such as representations of game worlds, characters, and so on. The game execution engine 112A-N may present this locally stored information, and augment the rendered information based on the game station information 104A-N obtained from the electronic game server 100. Optionally, the user devices 110A-N may represent thin clients, and the electronic game may be accessed via a browser executing on the user devices 110A-N. In this example, the electronic game server 100 may implement a web application. The user devices 110A-N may provide user input 114-N to the electronic game server 100 for processing. The electronic game server 100 may then update the user interface presented within respective browsers on the user devices 110A-N.

A representation of a social hub 102 is illustrated in FIG. 1A. The social hub 102 can represent a game world, or a portion thereof, in which players may control characters 106A-N. The social hub 102 may disallow certain actions by players, such as harming other player-controlled characters. Additionally, the social hub 102 may enable, or otherwise encourage, a social aspect to the electronic game. For example, a player of user device 110A may provide verbal input (e.g., via a microphone), or text input, and the electronic game server 100 may route the input to one or more remaining user devices. In this way, the players may communicate with each other in the social hub 102.

As described above, the characters 106A-N may be associated with respective items. An example association may include a character 106B equipping an item (e.g., a hat), such that the item may be visually depicted on the character 106N. Another example association may include the character 106B otherwise utilizing the item (e.g., the item may represent a gesture, and the character 106B may perform the gesture based on user input). These items may be obtained from within the game world, for example from virtual item containers. Thus, in the social hub 102 the characters 106A-N may be depicted as wearing, or otherwise equipping, certain items. As will be described below, with respect to FIG. 1B, a player may cause an item equipped by a different player's character to be included in a wishlist. The player may then cause the included item to be enabled for his/her character's use.

While the example figure illustrates a social hub 102, it should be understood that the techniques described herein may be utilized in arbitrary game worlds. For example, the techniques described herein may be utilized in game worlds, or portions thereof, in which players may fight other players.

Figure 1B:
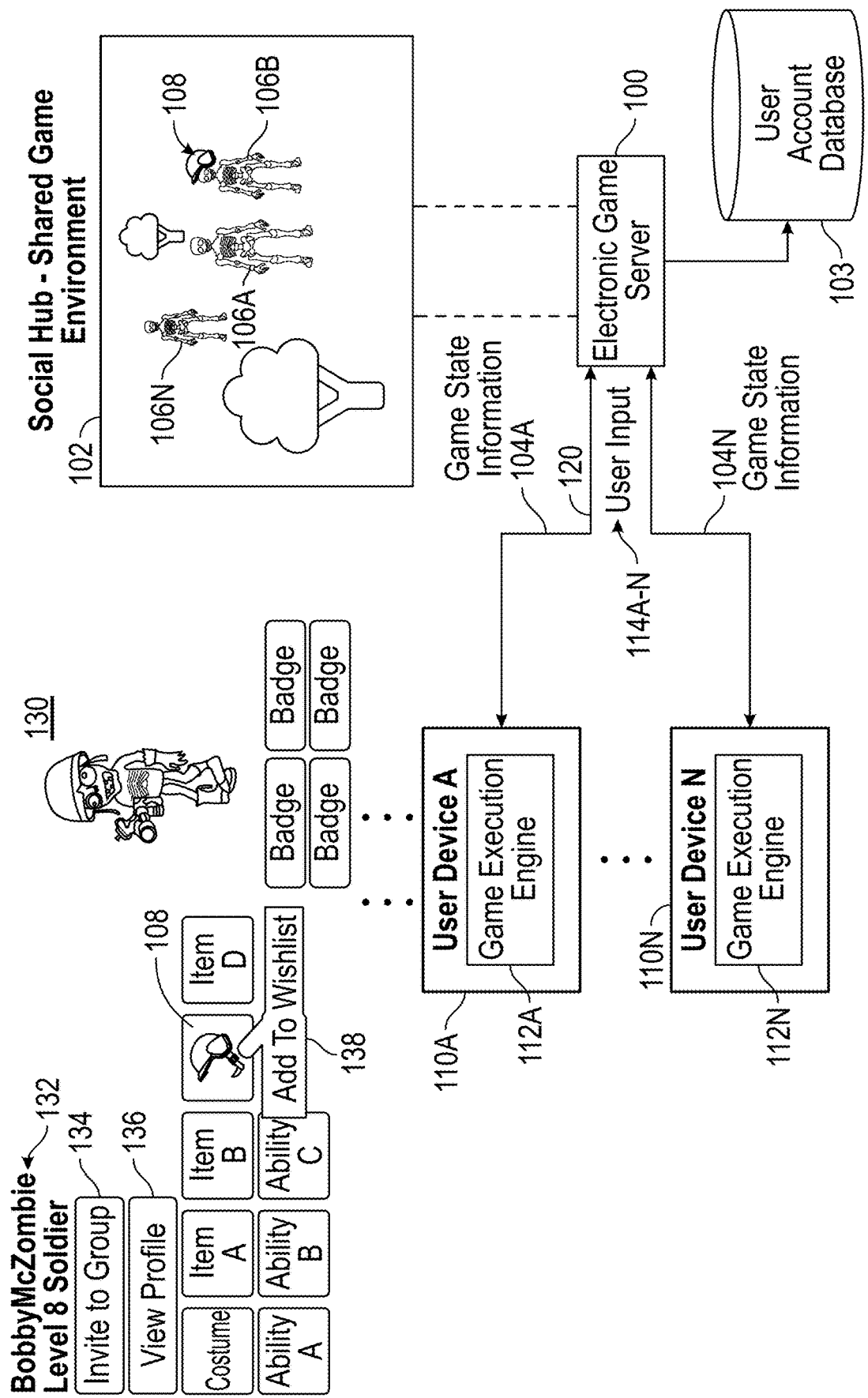
FIG. 1B is a block diagram illustrating an example user device presenting a user interface to include an item in a wishlist.

FIG. 1B is a block diagram illustrating an example user device 110A presenting a user interface 130 to include an item 108 in a wishlist. As described above, a first player may cause an item 108 associated with a second character 106B controlled by a second player to be included in a wishlist. As illustrated in the social hub 102, a first character 106A (e.g., controlled by the first player) is located proximate to the second player 106B. A user device 110A presenting a view of the social hub 102, for example associated with the first player, may therefore include a view of the second character 106B. As illustrated in the social hub, an item 108 is presented on the second character 106B. In the example of FIG. 1B, the first player 106A has requested that user interface 130 be presented to inspect the second character's 106B items.

To cause inspection of the second character 106B, the first player may provide specific user input to his/her user device 110A. For example, the first player may access a menu presented on the user device 110A, and request an inspection. As another example, the first player may view the second character 106B on the user device 110A and select the second character 106B. For example, the first player may utilize a mouse or keyboard to cause selection of the second character 106B. With respect to a mobile device, such as a device including a touch-screen, the first player may touch a portion of the screen depicting the second character 106B.

The user device 110A may therefore provide a request associated with inspecting the second character 106B to the electronic game server 100. The electronic game server 100 may then access game state information, and obtain indications of the items associated with the second character 106B. User interface 130 may then be presented on user device 110A, which indicates, at least, the items associated with the second character 106B. For example, the game execution engine 112A may cause rendering of the user interface 130, and include the information received from the electronic game server 100 regarding the items. Optionally, the electronic game server 100 may request the indications of items from a user device being controlled by the second player. The electronic game server 100 may obtain the indications, and cause user interface 130 to be presented.

As illustrated in user interface 130, user profile information associated with the second character 106B is presented. For example, a name 132 of the second character may be included along with game information (e.g., a level of the second character, experience points, and so on). Additionally, user interface 130 may include selectable options associating with different actions. An example action 134 may include inviting the second character 106B to a group. For example, the request may cause the second player to enter a chat room with the first player, or may cause the second character to form a team with the first player (e.g., to play subsequent missions or goals). Another example action 136 may include viewing a detailed profile of the second character 106B. The detailed profile may include achievements earned by the second player, friends of the second player, and so on.

User interface 130 further indicates items associated with the second character 106B. For example, a costume equipped by the second character 106B is presented. Additionally, different abilities (e.g., Ability A-C) of the second character 106B are presented. The items equipped by the second character 106B are also presented. With respect to item 108 (e.g., a hat), the first player may view the item 108 in detail. Optionally, for certain items which may produce a non-cosmetic result (e.g., increased armor, magic, and so on), the first player may view detailed information related to these non-cosmetic results. Optionally, the first player may request information indicating a composition of the first item. For example, certain electronic games may enable crafting of items. Thus, the first player may request the elements, or game aspects, which are required to cause crafting of item 108.

A selectable option 138 to add item 108 to the first player's wishlist is illustrated in user interface 130. As will be described in more detail below, the first player may utilize a slot within his/her wishlist to include the item 108. For example, the wishlist may include a threshold number of available slots (e.g., 3, 4, 5, 8, and so on). The wishlist may store items which the first player desires to acquire, but has not yet acquired. Additionally, the wishlist may enable the first player to receive one or more items included in the wishlist. As an example described in more detail below, the first player may select an item included in his/her wishlist. The first player may then request that the selected item be constructed, or ordered, for utilization by the first character 106A. This request may incur a fee, such as via payment of a soft in-game currency (e.g., generated through gameplay) or a hard in-game currency (e.g., a coin, or other currency, for which players may utilize money). With respect to the first player including item 108 in his/her wishlist, the electronic game server 100 may then enable access to item 108. Optionally, the first player may be required to wait a threshold amount of time (e.g., 24 hours, 32 hours, 48 hours) before the first character 106A may equip the item 108.

It should be appreciated that certain items may be unable to be included in a wishlist. For example, certain items may only be obtained, learned, through completion of different tasks, goals, achievements, and so on. As another example, certain items may be obtained from virtual item containers which are not configured to be included in a wishlist. Example items may include legendary, or other rare, items. When viewing user interface 130, these items may be indicated as not being items which can be included in a wishlist. For example, the items may be adjusted in color (e.g., greyed out), or otherwise made inaccessible to add to the wishlist.

Figure 2:
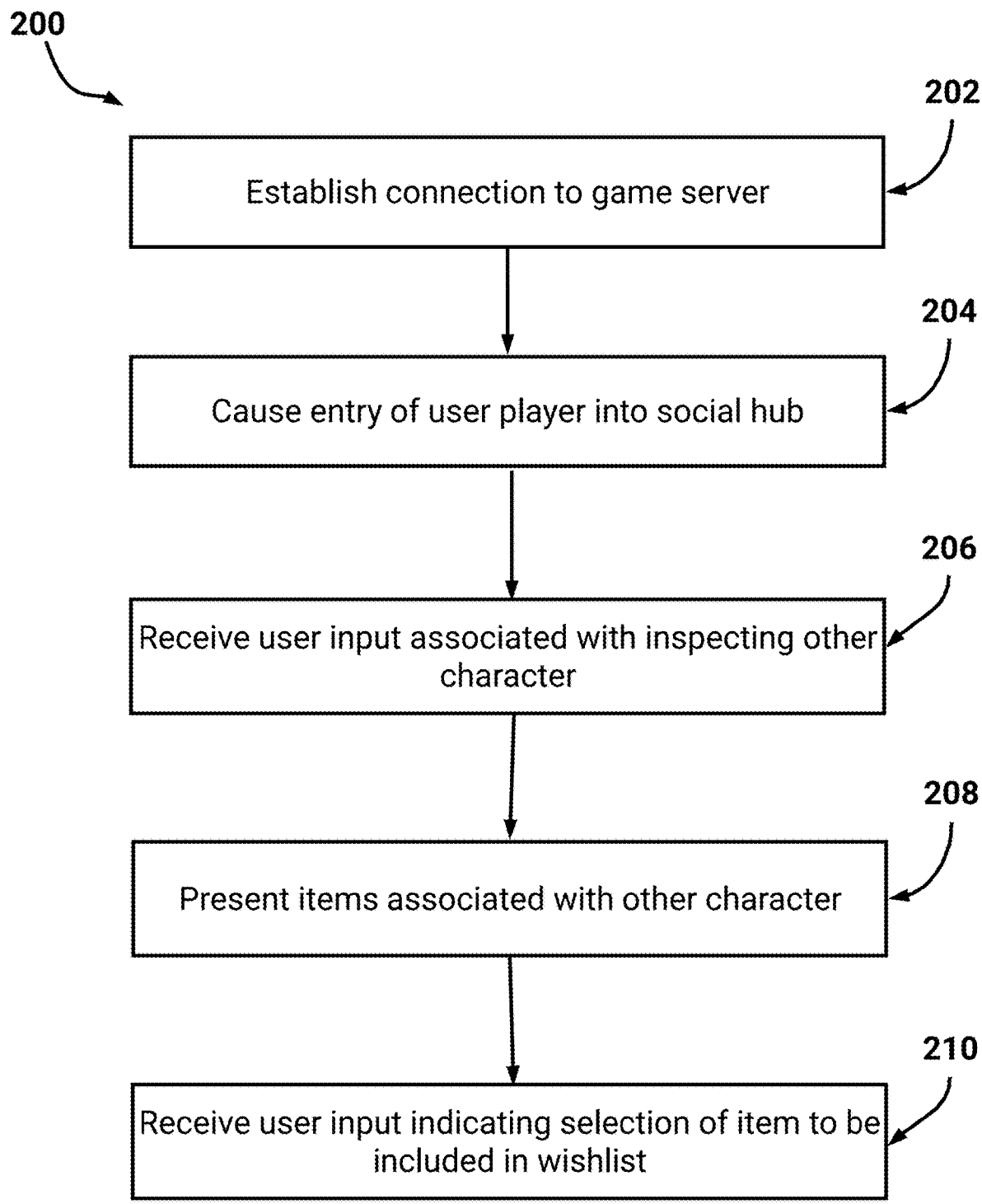
FIG. 2 is a flowchart of an example process for enabling selection of an item for inclusion in a wishlist of an electronic game.

FIG. 2 is a flowchart of an example process 200 for enabling selection of an item for inclusion in a wishlist of an electronic game. For convenience, the process 200 will be described as being performed by an electronic game application executing on a user device of one or more processors (e.g., the user device 110A).

At block 202, the user device establishes a connection to a game server. As described in FIG. 1A, the user device may connect to a game server to play an online game (e.g., via a network, such as the internet). The user device may provide authentication, or authorization information, to the game server. For example, the user device may provide a user name, password, and so on which is associated with a user account of a player utilizing the user device.

At block 204, the user devices cause entry of the player into a social hub. As depicted in FIGS. 1A-1B, a social hub may represent a virtual game world in which characters can interact socially. Since the social hub may disallow certain actions, such as characters harming each other, enemies harming characters, and so on, the social hub may enable the characters to communicate with each other. Additionally, the social hub can provide a platform for players to depict their favorite items. For example, a particular player may cause his/her character to equip a rare item. In this way, the particular player may 'show off' the rare item within the social hub.

At block 206, the user device receives user input associated with inspecting a particular character. As described in FIG. 1B, the player associated with the user device may provide user input to cause inspection of the particular character. For example, the player's character may be within a threshold proximity of the particular character. The player may then indicate that the particular character's items are to be presented on the user device.

At block 208, the user device presents items associated with the particular character. As illustrated in user interface 130, the user device may present the items equipped, or otherwise associated with, the other character.

At block 210, the user device receives user input indicating selection of item to be included in a wishlist. The player associated with the user device may provide user input to cause inclusion of a presented item in his/her wishlist. The wishlist may optionally be maintained by the electronic game server, such that the electronic game server may update stored information associated with the player (e.g., profile information). In this way, the wishlist may be accessible whenever the player joins the electronic game (e.g., by different user devices). Optionally, the wishlist may be maintained by the user device of the player. The wishlist may optionally be synchronized with the electronic game server upon any modification to the wishlist. In this way, the electronic game server may obtain the current items within the wishlist. As will be described below, the player may cause one or more items included in the wishlist to be enabled for utilization by the player's character.

Figure 3A:
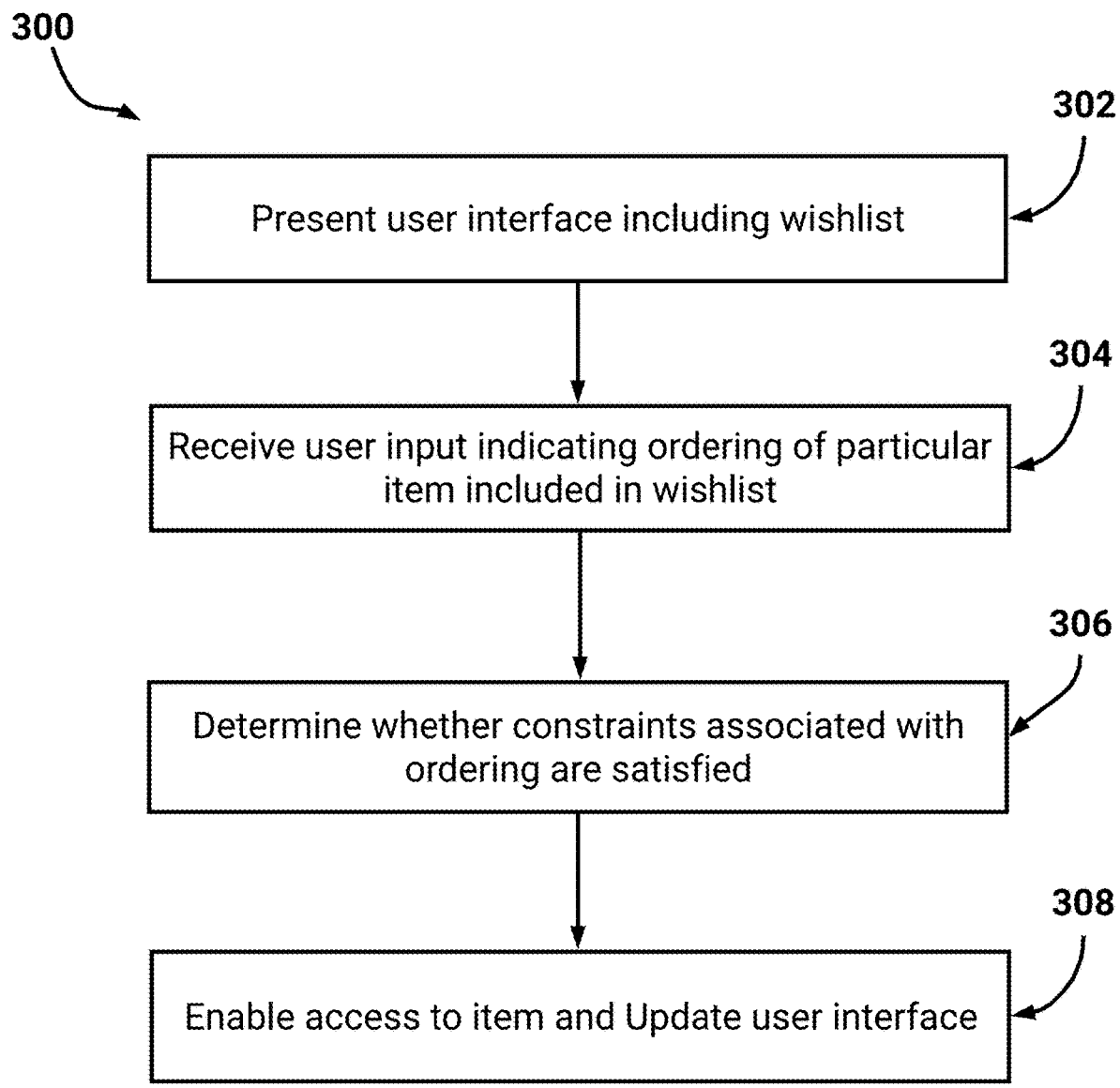
FIG. 3A is a flowchart of an example process for enabling access to an item included in a player's wishlist.

FIG. 3A is a flowchart of an example process 300 for enabling access to an item included in a player's wishlist. For convenience, the process 300 will be described as being performed by an electronic game application executing on a user device of one or more processors (e.g., the user device 110A).

Figure 3B:
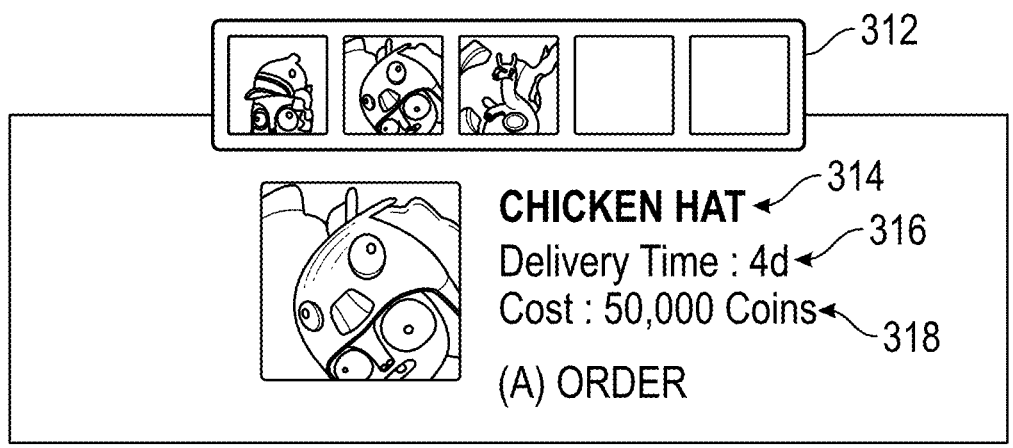
FIG. 3B is an example user interface illustrating an item included in a wishlist being requested for access.

At block 302, the user device presents a user interface illustrating the player's wishlist. As described above, the player may traverse a game world associated with an electronic game, and cause inclusion of certain items into his/her wishlist. The wishlist may optionally have a threshold number of slots, such that the player may be required to remove an item to include a new item. The user device may receive indications of the items included in the wishlist from an electronic game server associated with the electronic game. For example, the user device may receive graphical representations of the items along with descriptions. Reference will be made to FIG. 3B, which includes an example of the user interface.

FIG. 3B is an example user interface 310 illustrating an item 314 included in a wishlist 312 being ordered (e.g., requested for access). As illustrated, the wishlist 312 includes three items which the player previously included in the wishlist. Additionally, the wishlist 312 includes five slots in which items may be included. Optionally, player may increase the number of slots by earning experience points, provide a fee (e.g., in-game currency), or perform other actions to cause an increase in the number of slots.

At block 304, the user device receives user input indicating ordering of a particular item. As illustrated in FIG. 3B, the player has selected an item 314 (e.g., a chicken hat) for ordering. Information associated with the order is also presented, such as a time 316 associated with delivery of the order. As described above, the player may be required to wait a threshold amount of time until the player may utilize the item 314 on his/her character. In this example, the player is required to wait four days before the player can equip the chicken hat on the player's character. Additionally, a fee 318 associated with ordering the item 314 is included. In this example, the fee is 50,000 coins, which may represent a soft in-game currency. Optionally, the user interface 310 may indicate different times which are associated with different fees. Thus, the player may increase the fee to reduce the time. Additionally, the player may utilize an in-game currency to reduce the time.

At block 306, the user device optionally determines whether one or more constraints are satisfied. Upon ordering the item 314, the user device may optionally receive the item from the electronic game server. For example, the electronic game server may provide a graphical representation of the item to the user device. Receiving the item may further comprise enabling server-side access to the item. In this way, the player may equip the item, and the electronic game server may cause the visual representation of the player's character to include the item 314. With respect to the electronic game server providing the item, the item may be locked for use until constraints are satisfied. An example constraint may relate to time. For example, the user device may disallow utilization of the item 314 until the threshold time (e.g., 4 days) has passed.

Figure 3C:
FIG. 3C is an example user interface illustrating delivery of an item from a player's wishlist.

FIG. 3C is an example user interface illustrating delivery of an item from a player's wishlist. The player may monitor a status associated with the selected item. For example, user interface 320 indicates that the item has been 'shipped'. Thus, a count-down may occur (e.g., by the electronic game server) which can represent a construction time or shipping time. As illustrated, at a time when the player checked the status, the player had 23 hours remaining until he/she could utilize the item.

At block 308, the user device enables access to the item. As described in block 306, the user device may receive a graphical representation of the item to be equipped on the player's character. The electronic game server may also indicate that the item can be equipped. For example, the electronic game server may authorize the player's character to equip the item. The player may then be able to access one or more menus of the electronic game and cause the item to be equipped on his/her character.

Figure 4:
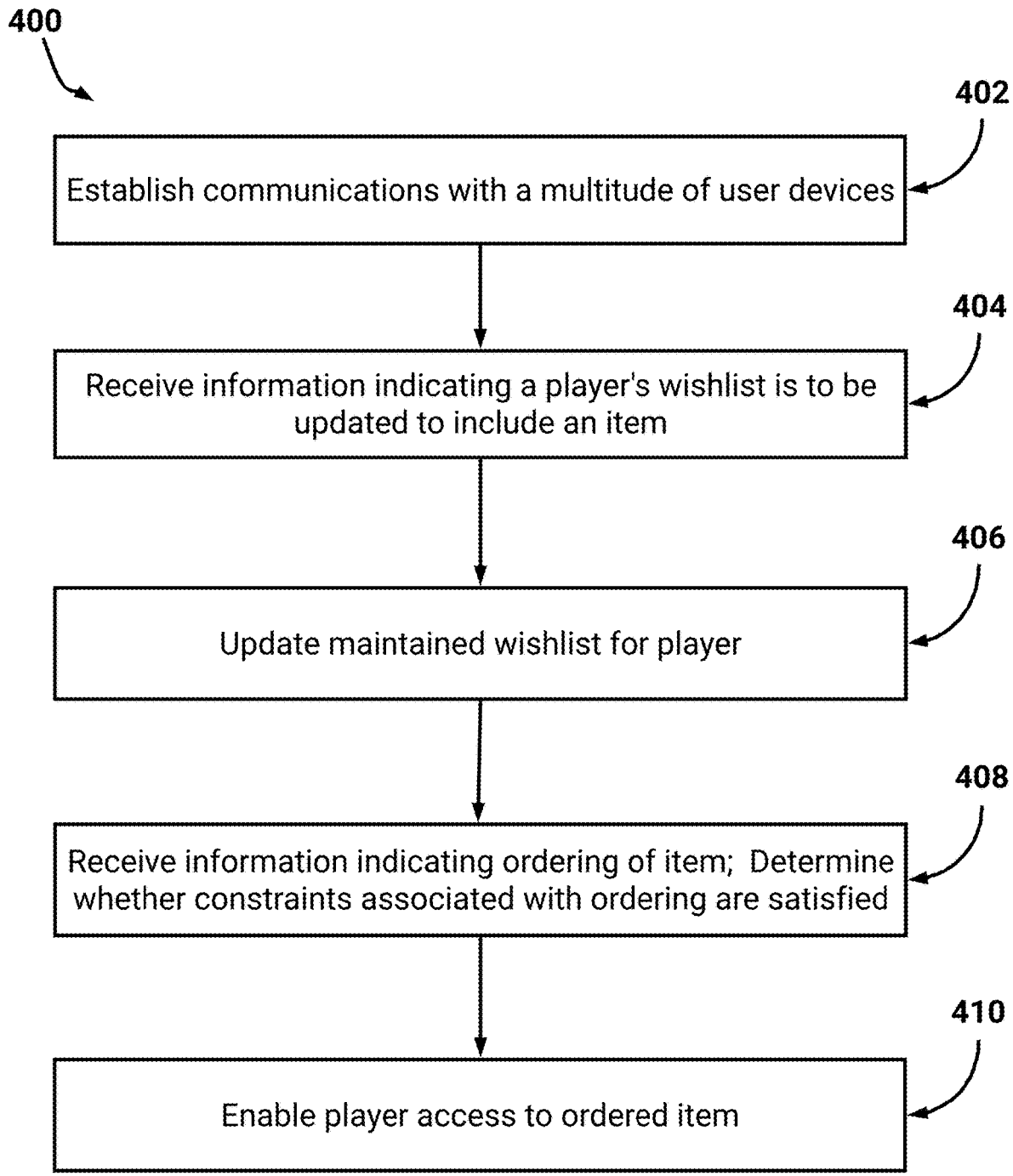
FIG. 4 is a flowchart of an example process for delivering an item to a player for utilization in the electronic game.

FIG. 4 is a flowchart of an example process 400 for delivering an item to a player for utilization in the electronic game. For convenience, the process 400 will be described as being performed by a system of one or more computers (e.g., the electronic game server 100).

At block 402, the system establishes communications with user devices. As described in FIG. 1A, the system may be a central server associated with an electronic game (e.g., an online game). The system may comprise multitudes of game servers, and a subset of user devices may connect to each of the game servers. Thus, the social hub illustrated in FIGS. 1A-1B may optionally include characters associated with user devices connected to a same game server.

At block 404, the system receives information indicating a player's wishlist is to be updated. As described in FIG. 2, a player may request items associated with a different player's character. The system may therefore cause presentation of the items on the player's user device. The player may then select from among the presented items, and include one or more items in the player's wishlist.

At block 406, the system updates the maintained wishlist. The system may receive indications of the selected items and update information associated with the player (e.g., profile information).

At block 408, the system receives information indicating ordering of an item. The player may request that a particular item included in the player's wishlist be ordered. The system may validate that one or more constraints are satisfied prior to enabling placement of the order. For example, the player may be required to provide a certain fee associated with the order. The player may also be required to obtain certain other items within the electronic game, such as respective threshold quantities of raw materials or goods which may form (e.g., within the game world) the materials or goods utilized to craft the item.

At block 410, the system enables player access to the ordered item. As described in FIG. 3A, the player may utilize the ordered item optionally after a threshold amount of time has passed. The system may then allow the player to equip, or otherwise utilize, the item. With respect to a cosmetic item, the player may cause his/her character to include the item on the representation of the character. With respect to a non-cosmetic item, such as a gesture, the player may enable the character to perform the gesture.

Figure 5:
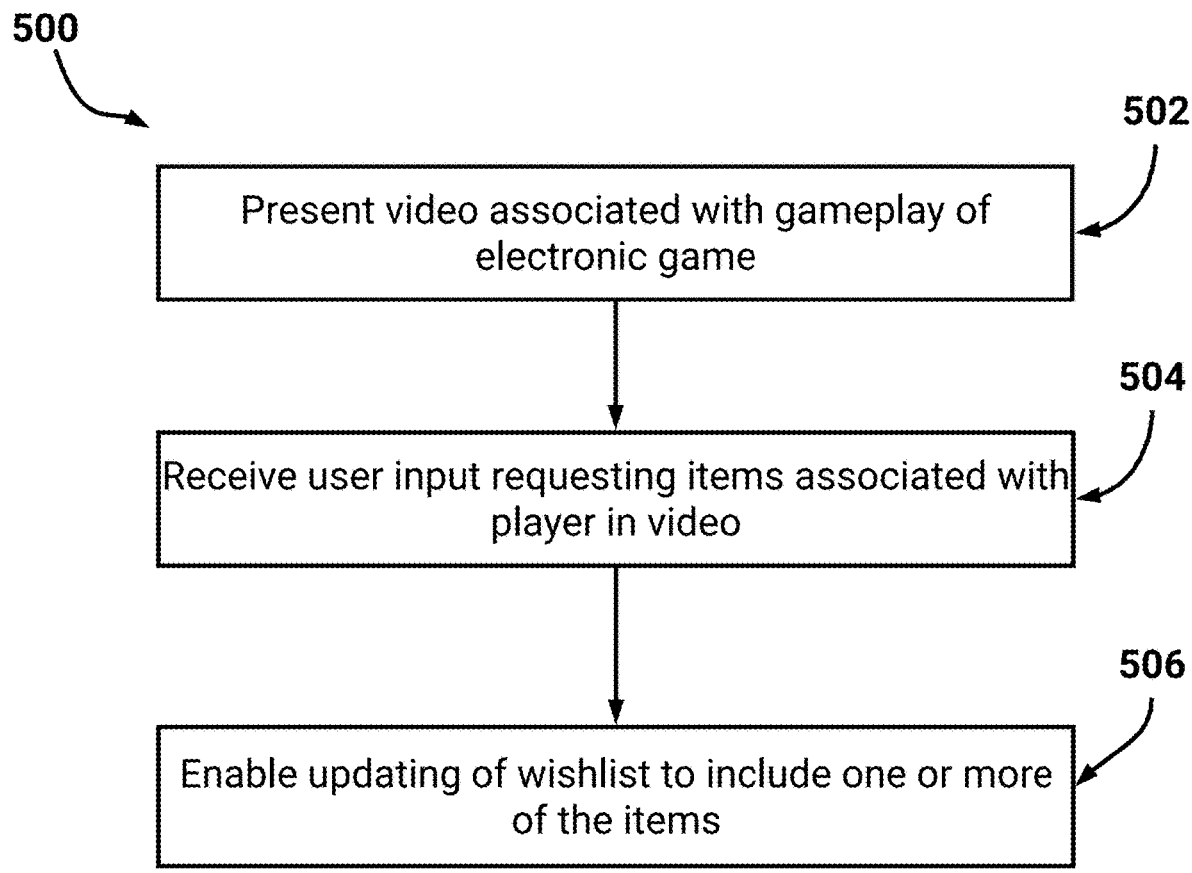
FIG. 5 is a flowchart of an example process for updating a wishlist based on a video associated with gameplay of the electronic game.

FIG. 5 is a flowchart of an example process 500 for updating a wishlist based on a video associated with gameplay of the electronic game. The process 500 may be performed by a user device of one or more processors (e.g., user device 110A), a system of one or more computers (e.g., the electronic game server 100), or a combination thereof as will be described. For convenience, the process 500 will be described as being performed by a user device.

At block 502, the user device presents video associated with gameplay of an electronic game. A user of the user device may access the video via a streaming web site. For example, the streaming web site may present live, or previously recorded, video of gameplay of the electronic game. Optionally, the video may be presented by an application associated with the electronic game. For example, the application may cause access to a streaming web site hosted by a system in communication with an electronic game server. As described above, the electronic game server (e.g., server 100) may coordinate amongst user devices to act as a central game server for the electronic game. Thus, as another example the video may be presented on the user device within a game world associated with the electronic game. For example, a user's character (e.g., a user associated with the user device) may view the video on an in-game movie screen, or the user may request that the video be presented on the user device (e.g., via in-game menu options).

At block 504, the user device receives user input requesting items associated with a player in the video. As the user of the user device views the video, the user may notice a particular item on a particular character included in the video. The user may then provide user input requesting the items associated with the particular character. For example, the request may be to inspect the particular character as described above.

With respect to the example of the streaming web site, the streaming web site may optionally include metadata associated with players and/or items. For example, the streaming web site may receive metadata from the electronic game server. With respect to a live video of gameplay, the electronic game server may (e.g., in substantially real-time) provide the metadata to the streaming web site. Optionally, the streaming web site may present the video along with indications of the players and/or items included in each frame of video. The presented indicates may be based on the streamed metadata. The user may then select a particular item and cause it to be included in his/her wishlist. As an example, the user's web browser may include a toolbar, or application, that causes the electronic game server to update the user's wishlist.

As another example, the streaming web site may include a link (e.g., hyperlink) that when selected causes the electronic game server to update the user's wishlist. The link may direct the user to an outside system, for example associated with the electronic game server or which is the electronic game server, hosting a web site. Via the web site, the user can update his/her wishlist. Optionally, the user may be required to log-into his/her user account (e.g., as described in block 402). Optionally, a cookie or token (e.g., an OAuth token) may be stored on the user's user device, and the cookie or token may authenticate the user.

With respect to recorded video, the streaming web site may store previously generated metadata. For example, the previously generated metadata may comprise timestamps associated with times at which players are included in the video. Thus, the user may select a particular character of interest. The streaming web site may optionally provide information to the electronic game server, and the server may provide indications of the items associated with the character. The streaming web site may then cause presentation of these items for the user's selection. Optionally, the metadata may comprise the items associated with the players. In this way, the streaming web site may avoid requesting the items from the server.

Optionally, in some implementations a system may be trained to identify items from video. For example, the system may implement one or more machine learning techniques to label the items as imaged in the video. An example machine learning technique may comprise a neural network trained on image data associated with the items. Thus, the system may present information identifying an item (e.g., an item selected by the user). As described above, the user may then utilize a tool bar, or a hyperlink, to cause the item to be included in his/her wishlist. The system may optionally be the electronic game server or may be associated with the streaming web site.

With respect to the example of the user viewing the video within the electronic game, the electronic game server may identify items associated with one or more characters. For example, if the user is viewing recorded video then electronic game server may obtain stored information identifying the characters within the recorded video. Thus, the electronic game server may access the items associated with the characters. These items may then be presented to the user.

At block 506, the user device enables updating of wishlist. As described above, the user may obtain indications of items associated with certain characters included in the video. With respect to the streaming web site, the user may utilize a toolbar associated with the user's browser to update the wishlist. For example, the toolbar may receive information from the electronic game server. The toolbar may further cause presentation of a user interface similar to user interface 130 (e.g., illustrated in FIG. 1B). As another example, the streaming web site may include a selectable link which causes access to a web site associated with the electronic game server. Via this website, the user may then update his/her wishlist. Optionally, the streaming web site may identify an item according to name and/or unique identifier. In this example, the user may directly enter the name and/or unique identifier within the electronic game.

With respect to the video being presented in the electronic game, the user may utilize the techniques described above with respect to FIGS. 2-3C. For example, the user may provide user input to cause inclusion of an item into his/her wishlist.

Overview of Computing Device

Figure 6:
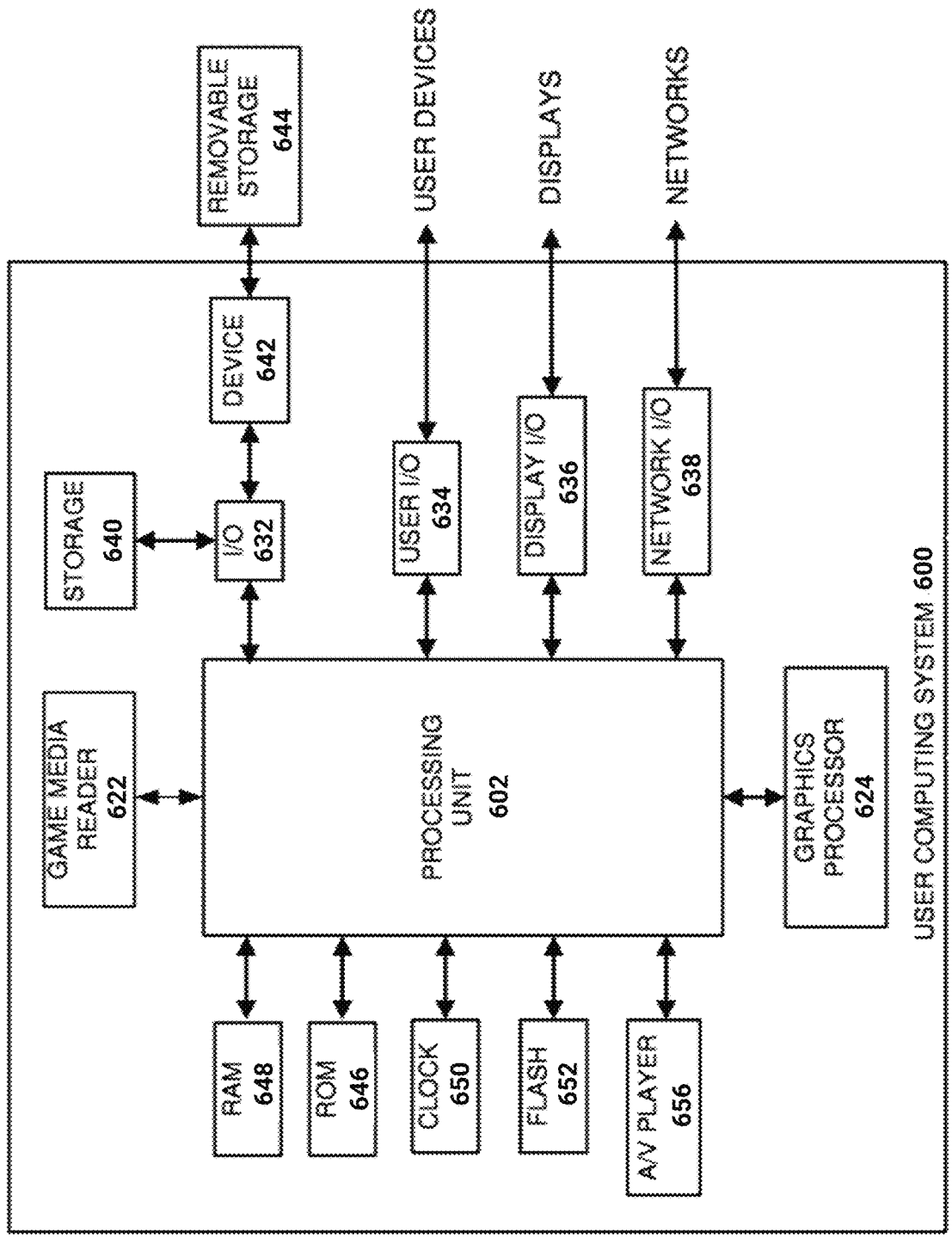
FIG. 6 illustrates an embodiment of a computing device according to the present disclosure.

FIG. 6 illustrates an embodiment of computing device 610 according to the present disclosure. Other variations of the computing device 610 may be substituted for the examples explicitly presented herein, such as removing or adding components to the computing device 610. The computing device 610 may include a game device, a smart phone, a tablet, a personal computer, a laptop, a smart television, a car console display, a server, and the like. The computing device 610 may also be distributed across multiple geographical locations. For example, the computing device 610 may be a cluster of cloud-based servers.

As shown, the computing device 610 includes a processing unit 620 that interacts with other components of the computing device 610 and also external components to computing device 610. A game media reader 622 is included that communicates with game media 612. The game media reader 622 may be an optical disc reader capable of reading optical discs, such as CD-ROMs or DVDs, or any other type of reader that can receive and read data from game media 612. One or more of the computing devices may be used to implement one or more of the systems disclosed herein.

Computing device 610 may include a separate graphics processor 624. In some cases, the graphics processor 624 may be built into the processing unit 620. In some such cases, the graphics processor 624 may share Random Access Memory (RAM) with the processing unit 620. Alternatively or additionally, the computing device 610 may include a discrete graphics processor 624 that is separate from the processing unit 620. In some such cases, the graphics processor 624 may have separate RAM from the processing unit 620. Computing device 610 might be a handheld game application device, a dedicated game console computing system, a general-purpose laptop or desktop computer, a smart phone, a tablet, a car console, or other suitable system.

Computing device 610 also includes various components for enabling input/output, such as an I/O 632, a user I/O 634, a display I/O 636, and a network I/O 638. I/O 632 interacts with storage element 640 and, through a device 642, removable storage media 644 in order to provide storage for computing device 610. Processing unit 620 can communicate through I/O 632 to store data, such as game state data and any shared data files. In addition to storage 640 and removable storage media 644, computing device 610 is also shown including ROM (Read-Only Memory) 646 and RAM 648. RAM 648 may be used for data that is accessed frequently, such as when a video game is being played.

User I/O 634 is used to send and receive commands between processing unit 620 and user devices, such as game controllers. In some embodiments, the user I/O 634 can include a touchscreen input. The touchscreen can be capacitive touchscreen, a resistive touchscreen, or other type of touchscreen technology that is configured to receive user input through tactile inputs from the player. Display I/O 636 provides input/output functions that are used to display images from the game being played. Network I/O 638 is used for input/output functions for a network. Network I/O 638 may be used during execution of a game, such as when a game is being played online or being accessed online, application of fraud detection, and/or generation of a fraud detection model.

Display output signals produced by display I/O 636 comprise signals for displaying visual content produced by computing device 610 on a display device, such as graphics, user interfaces, video, and/or other visual content. Computing device 610 may comprise one or more integrated displays configured to receive display output signals produced by display I/O 636. According to some embodiments, display output signals produced by display I/O 636 may also be output to one or more display devices external to computing device 610.

The computing device 610 can also include other features that may be used with a video game, such as a clock 650, flash memory 652, and other components. An audio/video player 656 might also be used to play a video sequence, such as a movie. It should be understood that other components may be provided in computing device 610 and that a person skilled in the art will appreciate other variations of computing device 610.

Program code can be stored in ROM 646, RAM 648 or storage 640 (which might comprise a hard disk, other magnetic storage, optical storage, other non-volatile storage or a combination or variation of these). Part of the program code can be stored in ROM that is programmable (ROM, PROM, EPROM, EEPROM, and so forth), and part of the program code can be stored in storage 640, and/or on removable media such as game media 612 (which can be a CD-ROM, cartridge, memory chip or the like, or obtained over a network or other electronic channel as needed). In general, program code can be found embodied in a tangible non-transitory signal-bearing medium.

Random access memory (RAM) 648 (and possibly other storage) is usable to store variables and other game and processor data as needed. RAM 648 is used and holds data that is generated during the execution of an application and portions thereof might also be reserved for frame buffers, application state information, and/or other data needed or usable for interpreting user input and generating display outputs. Generally, RAM 648 is volatile storage and data stored within RAM 648 may be lost when the computing device 610 is turned off or loses power.

As computing device 610 reads game media 612 and provides an application, information may be read from game media 612 and stored in a memory device, such as RAM 648. Additionally, data from storage 640, ROM 646, servers accessed via a network (not shown), or removable storage media 644 may be read and loaded into RAM 648. Although data is described as being found in RAM 648, it will be understood that data does not have to be stored in RAM 648 and may be stored in other memory accessible to processing unit 620 or distributed among several media, such as game media 612 and storage 640.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated, via software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence or can be added, merged, or left out altogether (for example, not all described acts or events are necessary for the practice of the algorithms). Moreover, in certain embodiments, acts or events can be performed concurrently, for example, through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, for example, a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is understood with the context as used in general to present that an item, term, etc., may be either X, Y, or Z, or any combination thereof (for example, X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure.

What is claimed is:

1. A computer-implemented method comprising:
  by a system of one or more computers executing computer-readable instructions,
  establishing connections with a plurality of user devices, each of the plurality of user devices being controlled by a player of a plurality of players, the user devices executing respective game engines associated with an electronic game, and the user devices device being controlled by a respective player of a same game world and presenting respective views of a game world of the electronic game, wherein the views are associated with respective virtual characters character of the plurality of players within the game world, and wherein the virtual characters comprise a first virtual character of a first player of the plurality of players and a second virtual character of a second player of the plurality of players;
  receiving information indicating that a wishlist associated with the first player is to be updated, wherein updating comprises associating a particular item with the wishlist, the particular item being equipped by the second virtual character of a second player positioned, at least, within a threshold proximity of the first virtual character of the first player within the game world;
  causing presentation, via a first user device controlled by the first player, of a user interface associated with ordering the particular item, the user interface identifying a plurality of different time periods, wherein each time period is an amount of time the first player is constrained to wait until the particular item is accessible by the first virtual character;
  obtaining information identifying selection of a first time period of the plurality of time periods indicating that a particular player has provided user input to cause ordering of the particular item; and
  in response to determining that the first time period has been exceeded satisfaction of one or more constraints, enabling access to the particular item within the game world by the first player, wherein the first virtual character of the first player is configured to equip the particular item, and wherein the particular item is rendered on the first virtual character within the game world.

2. The method of claim 1, further comprising:
  receiving, from the first user device associated with the first player, a request associated with inspecting the second virtual character;
  accessing information indicating items equipped by the second virtual character; and
  causing user interface information to be presented on the first user device associated with the indicated items.

3. The method of claim 2, wherein receiving information indicating that the wishlist is to be updated comprises:
  receiving selection of an item presented in the user interface, the item being the particular item.

4. The method of claim 1, wherein the wishlist is associated with items which the first player has viewed in the game world, and wherein the wishlist comprises a threshold number of slots for which one or more of the items may be associated.

5. The method of claim 1, wherein each time period of the plurality of time periods is determined based on a respective threshold quantity of in-game currency required to be utilized.

6. The method of claim 1, wherein the plurality of time periods represent different times associated with constructing or shipping the particular item, and wherein the plurality of time periods are based on a rarity associated with the particular item.

7. The method of claim 1, further comprising:
  receiving, from the first user device associated with the first player, a request associated with a status of the ordering of the particular item;

determining a remaining time associated with the first time period; and causing presentation, on the first user device, of a user interface identifying the remaining time.

8. The method of claim 1, wherein enabling access comprises updating user profile information associated with the first player, such that the first player is authorized to equip the particular item.

9. A system comprising one or more computers and computer storage media storing instructions that, when executed by the system, cause the system to perform operations comprising:

establishing connections with a plurality of user devices, each of the plurality of user devices being controlled by a player of a plurality of players, the user devices executing respective game engines associated with an electronic game, and the user devices device being controlled by a respective player of a same game world and presenting respective views of a game world of the electronic game, wherein the views are associated with respective virtual characters character of the plurality of players within the game world, and wherein the virtual characters comprise a first virtual character of a first player of the plurality of players and a second virtual character of a second player of the plurality of players;

receiving information indicating that a wishlist associated with the first player is to be updated, wherein updating comprises associating a particular item with the wishlist, the particular item being equipped by the second virtual character of a second player positioned, at least, within a threshold proximity of the first virtual character of the first player within the game world;

causing presentation, via a first user device controlled by the first player, of a user interface associated with ordering the particular item, the user interface identifying a plurality of different time periods, wherein each time period is an amount of time the first player is constrained to wait until the particular item is accessible by the first virtual character;

obtaining information identifying selection of a first time period of the plurality of time periods indicating that a particular player has provided user input to cause ordering of the particular item; and in response to determining that the first time period has been exceeded satisfaction of one or more constraints, enabling access to the particular item within the game world by the first player, wherein the first virtual character of the first player is configured to equip the particular item, and wherein the particular item is rendered on the first virtual character within the game world.

10. The system of claim 9, wherein the operations further comprise:

receiving, from a first user device associated with the first player, a request associated with inspecting the second virtual character;

accessing information indicating items equipped by the second virtual character; and causing user interface information to be presented on the first user device associated with the indicated items.

11. The system of claim 10, wherein receiving the information indicating that the wishlist is to be updated comprises:

receiving selection of an item presented in the user interface, the item being the particular item.

12. The system of claim 9, wherein the plurality of time periods represent different times associated with constructing or shipping the particular item, and wherein the plurality of time periods are based on a rarity associated with the particular item.

13. The system of claim 9, wherein the operations further comprise:

receiving, from a first user device associated with the first player, a request associated with a status of the ordering of the particular item;

determining a remaining time associated with the first time period; and causing presentation, on the first user device, of a user interface identifying the remaining time.

14. The system of claim 9, wherein enabling access comprises updating user profile information associated with the first player, such that the first player is authorized to equip the particular item.

15. A computer-implemented method comprising:

by a user device of one or more processors, causing execution of a game engine associated with an electronic game, wherein the game engine is in communication with an electronic game server configured to communicate with a plurality of user devices, wherein players of the respective user devices control virtual characters within a game world of the electronic game, and wherein the game engine presents a view of the game world associated with a virtual character within the game world;

receiving user input associated with control of the virtual character included in the game world, the virtual character being configured to move about the game world;

presenting information indicating one or more items, of a plurality of items, which are equipped by a different virtual character within the game world, the different virtual character being included in the view of the game world;

receiving information indicating that a wishlist is to be updated, wherein updating comprises associating a particular item with the wishlist, the particular item being equipped by the different virtual character, and wherein receiving the information comprises presenting a user interface associated with ordering the particular item, the user interface identifying a plurality of time periods specifying respective times until the virtual character is configured to access the particular item, and receiving selection of a particular time period of the plurality of time periods; and providing, to the electronic game server, the received information, and, upon expiration of the particular time period, receiving information indicating access to the particular item, wherein the virtual character is configured to equip the particular item, and wherein the particular item is rendered on the virtual character within the game world.

16. The method of claim 15, wherein the particular item is included in a subset of virtual item containers included in the game world, and wherein access to the particular item is constrained to either locating a virtual item container which includes the particular item or associating the particular item with the wishlist.

17. The method of claim 16, wherein the wishlist is associated with the particular item based on validation that the virtual character is within a threshold distance of the different virtual character within the game world.

18. The method of claim 16, wherein the particular item is associated with a rarity, such that virtual item containers included in the game world include the particular item with a likelihood based on the rarity.

19. The method of claim 15, further comprising:
- receiving user input associated with inspection of the different virtual character;
- receiving, from the electronic game server, indications of the items equipped by the different virtual character, wherein the user device presents the indicated items along with a selectable option to update the wishlist; and
- in response to receiving user input associated with the selected option, updating the wishlist to be associated with the particular item.

20. The method of claim 15, wherein the wishlist comprises a threshold number of slots for which items of the plurality of items may be associated, and wherein the game engine is configured to present user interface information identifying the wishlist.

* * * * *